US008214423B2

(12) United States Patent
Freitag

(10) Patent No.: US 8,214,423 B2
(45) Date of Patent: *Jul. 3, 2012

(54) CAD SYSTEM

(75) Inventor: Stefan Freitag, Nufrinjen (DE)

(73) Assignees: Hewlett-Packard Company; Parametric Technology Corporation, Needham, MA (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/446,033

(22) Filed: Jun. 2, 2006

(65) Prior Publication Data

US 2006/0265496 A1   Nov. 23, 2006

Related U.S. Application Data

(63) Continuation of application No. 09/648,152, filed on Aug. 25, 2000, now Pat. No. 7,069,192.

(51) Int. Cl.
*G06F 15/16* (2006.01)

(52) U.S. Cl. ........ 709/201; 709/202; 709/203; 709/204; 709/205; 709/206; 709/207; 703/1; 703/6

(58) Field of Classification Search ............. 364/474.24; 709/201–207; 714/6; 703/1, 6
See application file for complete search history.

(56) References Cited

U.S. PATENT DOCUMENTS

| | | | |
|---|---|---|---|
| 5,446,842 A | | 8/1995 | Schaeffer et al. |
| 5,694,544 A | | 12/1997 | Tanigawa et al. |
| 5,845,299 A | * | 12/1998 | Arora et al. ................... 715/209 |
| 5,963,451 A | * | 10/1999 | Seki et al. ...................... 700/182 |
| 6,023,749 A | * | 2/2000 | Richardson .................... 711/203 |
| 6,055,541 A | * | 4/2000 | Solecki et al. ............. 707/103 R |
| 6,230,066 B1 | | 5/2001 | Sferro et al. |
| 6,232,982 B1 | * | 5/2001 | Harding ......................... 715/738 |
| 6,295,513 B1 | * | 9/2001 | Thackston ......................... 703/1 |
| 6,338,096 B1 | * | 1/2002 | Ukelson ......................... 719/319 |
| 6,393,422 B1 | * | 5/2002 | Wone .............................. 707/10 |
| 6,397,117 B1 | * | 5/2002 | Burrows et al. ................. 700/97 |
| 6,654,032 B1 | * | 11/2003 | Zhu et al. ....................... 715/753 |
| 6,654,737 B1 | | 11/2003 | Nunez |
| 6,680,730 B1 | * | 1/2004 | Shields et al. ................. 345/169 |
| 6,704,695 B1 | * | 3/2004 | Bula et al. .......................... 703/6 |
| 6,917,950 B2 | * | 7/2005 | Mcbride et al. ............... 707/203 |
| 6,957,186 B1 | | 10/2005 | Guheen et al. |
| 7,069,192 B1 | | 6/2006 | Freitag |
| 7,176,942 B2 | * | 2/2007 | Chartier et al. ............... 345/619 |
| 7,219,122 B1 | * | 5/2007 | Pena-Mora et al. ........... 709/201 |
| 7,424,671 B2 | * | 9/2008 | Elza et al. ...................... 715/234 |
| 2002/0049786 A1 | * | 4/2002 | Bibliowicz et al. ........... 707/511 |
| 2003/0085921 A1 | | 5/2003 | Ghosh et al. |
| 2003/0226151 A1 | * | 12/2003 | Hamada et al. ................ 725/132 |
| 2006/0250418 A1 | * | 11/2006 | Chartier et al. ............... 345/619 |

* cited by examiner

*Primary Examiner* — John Follansbee
*Assistant Examiner* — Saket K Daftuar
(74) *Attorney, Agent, or Firm* — Nelson Mullins Riley & Scarborough LLP

(57) ABSTRACT

A computer aided design (CAD) system is described where each type of change in a CAD-generated object is automatically and chronologically protocoled so that the object directly includes an abstract description of the history of the object independent of the CAD module used. This is particularly advantageous with decentralized CAD systems in which several constructors/designers are working together on the same draft, but located in different places. At the end of a session, the object history, i.e., the changes which have taken place, are directly exported, together with the object data, into the destination system. The abstract description is in a form independent of the system used.

20 Claims, 4 Drawing Sheets

FIG. 4

Collaboration Log contains all information required to understand what changes were done by whom for what reason Collaboration Log 1
Name: Mechanical Designer X
Location: Sindelfingen, Europe
Date: 12. October 1999
Time: 9:12am
Computer: 15.143.12.12
Description: Changed radius of hole number 2 from 3mm to 5mm
Operation: Change_hole
Object: hole_id
Value: 3
Dependencies: none
Status: agreed Collaboration Log 2
Name: Finite Element Analyst Y
Location: Fort Collins, Colorado, US
Date: 12. October 1999
Time: 9:11am
Computer: 15.144.128.04
Description: Increased wall thickness of all ribs by 0.5mm in order to meet specification
Operation: Offset_faces
Object: face_1_id, face_2_id, face_3_id, face_4_id
Value: 0.5mm
Dependencies: Log 3
Status: agreed Collaboration Log 2
Name: Manufacturing subcontractor Z
Location: Kobe, Japan
Date: 12. October 1999
Time: 9:15am
Computer: 22.255.128.22
Description: Draft angle of all ribs changes to 0.5 degrees (from 0.4 degrees)
Operation: Taper faces
Object: face_1_id, face_2_id, face_3_id, face_4_id
Value: 0.5mm
Dependencies: Log 2
Status: agreed

CAD SYSTEM

CROSS-REFERENCE TO RELATED APPLICATIONS

This application is a continuation of U.S. patent application Ser. No. 09/648,152 filed Aug. 25, 2000 now U.S. Pat. No. 7,069,192 and entitled "CAD SYSTEM," the disclosure of which is hereby incorporated herein by reference.

FIELD OF THE INVENTION

The present invention relates to a system for computer aided design (CAD) and particularly for a web-based, real-time collaborative CAD design process.

BACKGROUND OF THE INVENTION

Design projects in a whole range of fields generally require a collaboration of individuals and a coordination of information and tasks.

Most engineering design results from the joint efforts of a highly qualified team of engineers, designers, marketing specialists, etc. The people working on any particular product may belong to different companies, using different CAD systems and may be based in widely differing locations.

It is thus difficult and time-consuming for these people to exchange data and to discuss design ideas and modifications. Decisions can be delayed when members of the team are unable to travel or attend meetings. Further more, because members of the design team can be located all over the world, much expense and time can be spent in traveling to meetings to discuss the project.

Of course, copies of design drawings can be sent by fax or by computer communication and telephone conferences can be arranged between the members of the team. However, this means that the parts of the drawing to which a member of the team is referring needs to be described in words to the other members of the team involved in the telephone conference and misunderstandings can easily arise, particularly in very complex design projects. It is also not always immediately apparent what effect a modification to one component may have on other components.

The ability to access and collaborate on design data anywhere at any time is extremely important in product development if the development of a product is not to become prohibitively involved and expensive. Often, an inferior design has been chosen for production, since to change the features of the design and have them all agreed by all members of the team would involve too much time and expense in arranging meetings, conferences, etc.

In recent times, systems have been developed allowing designers based in different locations to work together over a network in a "Virtual Design Studio," particularly using web-based tools. These systems enable users to easily access and collaborate on design data.

There are now several CAD-design data packages which can be delivered in an easily usable manner to all members of the product development team, via a network, e.g. via the Internet. U.S Pat. Nos. 5,339,247; 5,815,683; and 6,094,658, for example, disclose such systems.

These "Virtual Design Studios" enable various members of the design team, and other observers, to "meet" over the network to detect and resolve design conflicts at all stages of product development.

One factor which has previously restricted the usefulness of the "Virtual Design Studio" for CAD applications is the amount of data contained in CAD models. Even models of simple products can reach hundreds of megabytes in size. During the virtual design process, these models have had to be transmitted across the Internet and this has previously not been a feasible solution.

However, over the past two years or so, new technologies have emerged which have enabled the virtual design process over the Internet to become a reality.

The process known as "streaming 3D" allows 3D data, such as the data making up CAD models, to be transmitted across networks incrementally, rather than all at once. As a user uses and manipulates a CAD model, the streaming 3D technology automatically downloads the portion the user can see. This technique allows user to operate on highly complex models via the Internet.

One such "streaming" system is the "Envision 3D" system. When the user accesses the sever, he enters a 3D model. A picture appears on his screen and then, as he starts to use various navigation tools, new information comes into view as and when required. New information is streamed from the sever and old data exits the system.

Similarly, the "ConceptWorks" system from RealityWave allows transmission of current CAD files to enable real-time collaboration over the Internet. Rather than transmitting an entire CAD file, only the parts of the file seen by the user are transmitted.

Powerful collaboration systems now exist which have the ability to support people at different spatial locations working together simultaneously on the same design project.

It is also possible for the results of changes within one design step or by one member of the design team to be fed back to the others while the work is going on. This clearly requires real-time communication between members of the virtual team and means for integrating and checking the results of work done by individuals.

The leading solution for real-time collaboration using the CAD 3D product model is CoCreate's "OneSpace" system which is essentially a virtual conference room where global product development teams can connect with each other.

Users distributed at different locations can, from their own computer screens, view a particular CAD model online in the course of a virtual meeting. They can note annotations to it and can modify the design. As a result, design problems can not only be identified more quickly but can also be discussed and solved there and then. IT is much more efficient to exchange suggestions and ideas while viewing the CAD model.

This system has been successfully used to hold online meetings with departments at other locations or with external suppliers and to implement the changes proposed by their development partners immediately. Furthermore, design alternatives can be explored there and then, with input from all of the design team who will have different fields of expertise and see different problems arising from suggested solutions or ideas.

The "OneSpace" system supports individual and shared understanding; allows users at different locations to view, inspect and mark up the same design, enables on-the-spot detection and resolution of conflicts and exploration of design alternatives in a real-time discussion and design forum.

"OneSpace" functions on top of most 3D CAD environments, which means that users do not need to invest in a new CAD technology to reap the benefits.

Thus, there are now several effective systems available which allow a large number of people involved in the production of a design to view, discuss and modify the design in a "virtual conference." The design can then be finalized much more quickly and forwarded for production.

However, the final version of the design is generally the result of many modifications, ideas and suggestions and the CAD data describing the design describe only the final result of a creative process, I.E. how a product or part of the product looks, but not why it was developed in one way and not in another, for example. There is nothing in the design data about the many ideas which were conceived and discarded for some reason and, in future designs, all of these ideas have to be reasoned through again and again.

OBJECTS OF THE INVENTION

The aim of the present invention is to improve on known CAD collaboration techniques by making them more flexible and available to a wider ranger of people, as well as making use of the whole creative process resulting in the finished design.

BRIEF SUMMARY OF THE INVENTION

The present invention is directed to a system and method which, according to one aspect of the present invention, there is provided a computer-aided design (CAD) system for designing an object, comprising:

a database for storing data on the shape and/or structure of the object;

a data processor for processing input commands for modifying the object and updating the data stored in the database accordingly; and data recordal means for recording the input commands chronologically and storing the record in the database with the object data.

Thus, according to another aspect, there is provided a collaborative computer-aided design (CAD) system for designing an object by a plurality of designers working on the design simultaneously, comprising:

a server comprising a database for storing data on the shape and/or structure of the object, and a processor for processing input commands for modifying the object and updating the data stored in the database accordingly; and data recordal means for recording the input commands chronologically and storing the record in the database with the object data; and a plurality of user terminals, each having a screen and a data input means and being connectable to the server via a network;

the user terminals being connected to the server such that a representation of the object can be simultaneously displayed on the screens of all user terminals and that modifications can be made to the object by inputting commands via the data input means, the commands being conveyed via the networks and processed via the sever processor and recorded by said sever data recordal means.

According to another aspect, there is provided a method of computer aided design of an object comprising:

storing data on the shape and/or structure of the object;
displaying a representation of the object on a screen;
modifying the shape and/or structure of the object by means of input commands to a computer associated with the screen, the input commands being processed to update the data stored accordingly and an image of the modified object being displayed; and automatically recording modifications made to the design and sorting information representation the modifications chronologically.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 shows an example of a collaboration log according to the invention.

DETAILED DESCRIPTION OF THE INVENTION

The preferred embodiment of the invention will be described as embodied in the "OneSpace" system. However, it should be understood that it is envisaged that the invention may be incorporated into other CAD systems.

Figure 1:
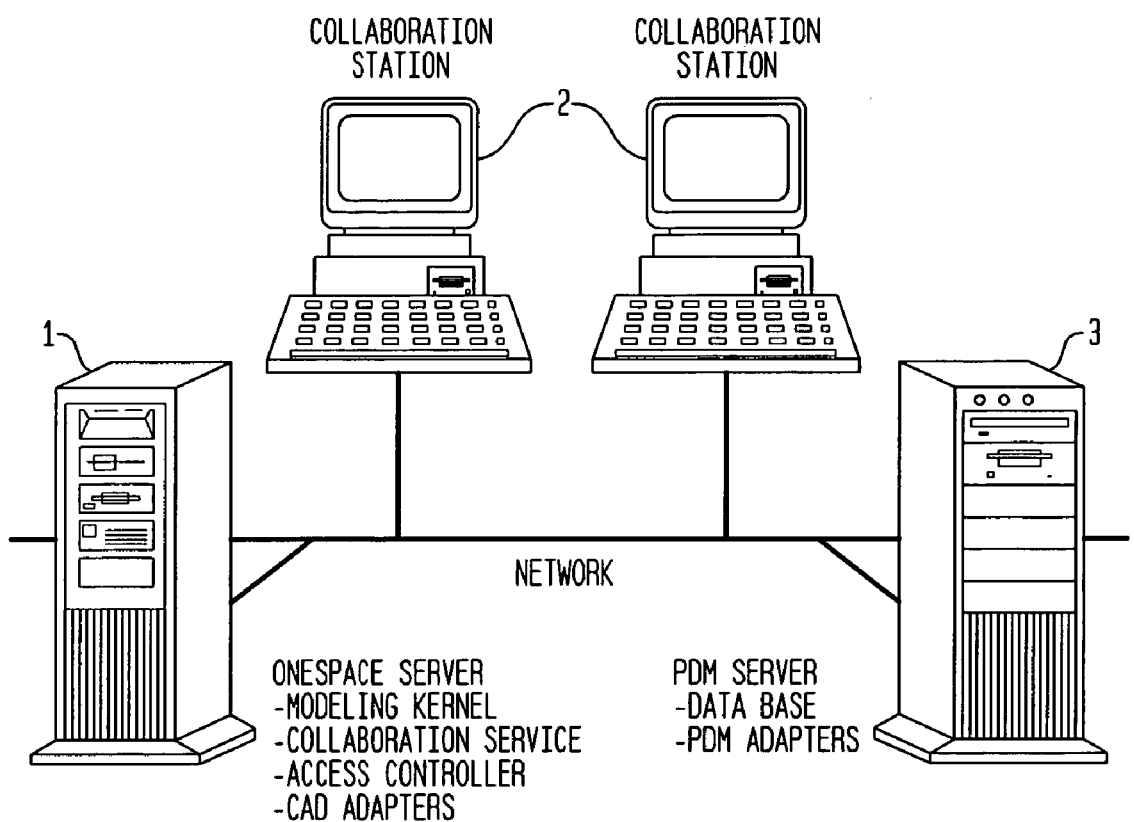
FIG. 1 is a simple diagram showing the basic architecture of a collaboration system in which the present invention may be implemented.

The architecture of a "OneSpace" collaboration system can be seen in FIG. 1. The system consists of a collaboration server 1 and clients or "collaboration stations" 2. These components can be located anywhere in a global network.

Figure 2:
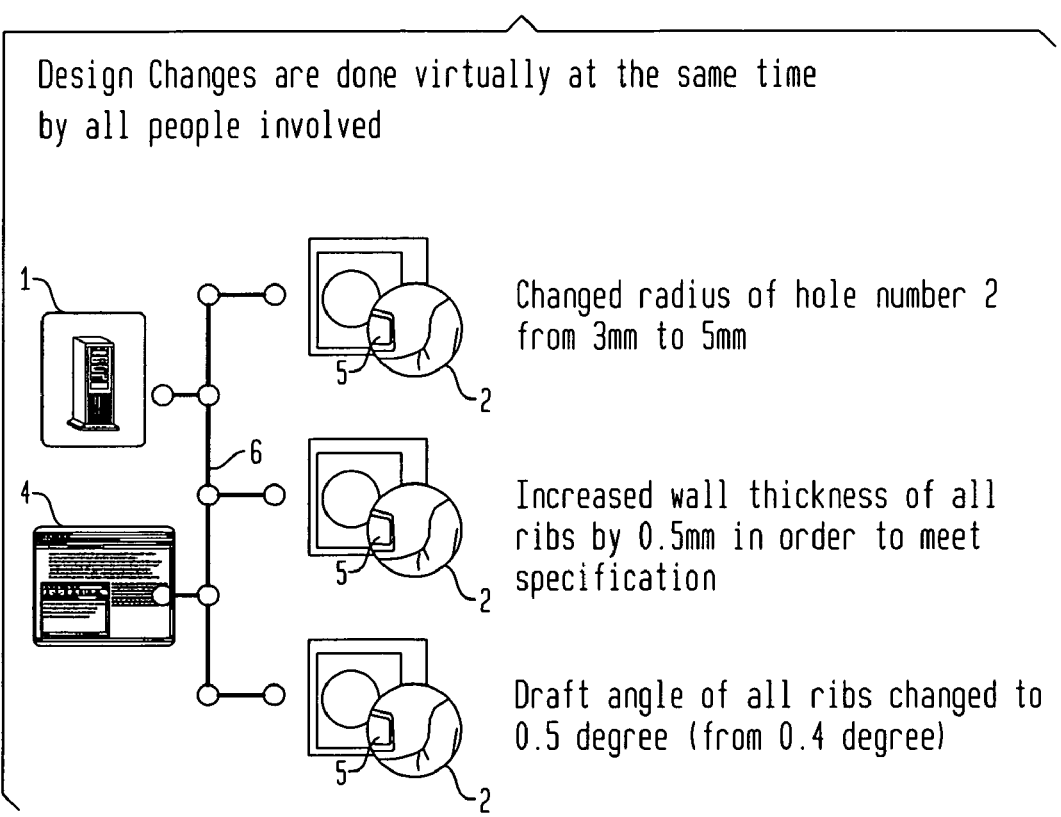
FIG. 2 shows how various people at different locations can collaborate on a design using a system such as shown in FIG. 1.

FIG. 2 shows an example where a design is being discussed and worked on simultaneously by a designer based in Europe, an analyst/inspector based in the USA and a manufacturer based in Japan.

The client is the front-end for the integrated collaboration application modules. Any participant or client (provided they have the appropriate authority) can trigger an upload of data into the server for synchronous real-time viewing, inspection, conference, mark-up and collaborative editing on the 3D model. Results of the session can be downloaded to local discs or stored in a PDM system 3 on the network. All upload and download requests, as well as all operations on 3D model, are under complete control of the configurable permission system discussed in more detail below.

The collaboration server 1 provides a solid modeling kernel to hold the 3D product model. The kernel is configured to work with models from any CAD system, imported via the 3D standard data formats STEP and IGES or through one of the native CAD adapters available in the system.

The server 1 gives clients 2 access to the loaded data and enables them to connect to and communicate with the server and toe ach other. Other collaboration services provided by the sever allow collaborative viewing and mark-up of a variety of document formats including 2D drawings, pixel and faster images, text documents and PDF files. Services also allow the exchange of text messages or the capture of collaboration information as classified notes. The collaboration stations 2 use multi-platform Java technology which offers the same intuitive and easy-to-use graphical user interface (GUI) on different platforms. The user interface can be adapted to different levels of different user groups and can function from off-line viewing of multi-format documents up to client-server based synchronous collaboration including 3D co-modeling.

One particular advantage of the "OneSpace" system is that users can collaborate with each other on 3D models from different CAD systems over the web, in real time. Users can bring heterogeneous models from different CAD systems together to view them in context, take precise measurements and annotate the model. Geometric modification of the 3D model is available to all users in a consistent fashion independent of the originating CAD system and the different CAD software installed on the different client stations. Because of these special CAD-independent capabilities, team embers outside of the enterprise, such as suppliers and customers, can join and actively participate in collaborative sessions.

The CAD adapters enable the import and export of native 3D model data from all of the major CAD systems, including CATIA, I-DEAS, ProEngineer, SolidDesigner, SolidWork and Unigraphics.

The preferred embodiment also provides a family of PDM adapters, providing users with the ability to search, access and store collaboration data from multiple PDM systems.

Collaboration data includes CAD files, 2D documents, annotations and mark-up as well as collaboration result reports and modified 3D models.

In many environments multiple PDM systems are used by different departments or organizations. The present system can be integrated into the engineering process and infrastructure by accessing data from the multiple PDM systems in the same collaboration session, whilst maintaining the specific access controls and business policies of each PDM system. PDM access can be either web-based or native and the integration can be configured to adapt to the customer-specific PDM use.

A collaborative design session using the "OneSpace" system is set up in a manner similar to a conference call. The person in charge of the conference books a time slot with the service provider and informs all of those participating of the time of the conference. Each participant is also given the sever address, which is an address of a site 4 on the World Wide Web. For security, the users can also be allocated an identification code which they must first input, when dialing into the conference.

To enter the virtual conference, each participant clicks on an icon on his desktop. Generally, the participants can all also communicate by telephone during the session, so that the changes and ideas shown on the screen can be discussed.

A collaboration station log-in window will then appear on each user's screen. The users select the server hosting the session, from the address previously communicated to them, and log in.

The model being discussed, or the parts of the model being discussed, will then appear on each participant's screen, together with notes and annotations. Each user (or those allowed access, if a limited access system is used) can move them, rotate them, change their view, etc. regardless of which CAD software they have installed on their own computer.

The preferred system operates in a standard TCP-IP local area network (LAN) or wide area network (WAN) infrastructure. The system is thus easy to integrate into existing intranets. It can use ISDN or modem-based dial-up connections and also works over the Internet. In the preferred system, it is a simple drag-and-drop process to load the model onto the server. The source of the data can be a file on the local disc of one of the clients or an entry in a PDM data base. The client drags the data entry from the source into the 3D collaboration window of the application area and data transfer is then initiated. Data is transferred from the source to the 3D collaboration server and the load sequence into the server's modeling kernel is initiated.

In one mode, the client simply uploads the model file written by a native CAD system from the data source to the server. In another mode, add-on modules can be used to allow the users to export or select assemblies or parts to the virtual conference room for immediate collaboration.

To save the results of a collaborative session, again, a simple drag-and-drop operation can be used. This initiates transmission from the selected 3D model to the appropriate destination. The model file is either stored in the local file system of the collaboration station or in the data base of the PDM server 3.

Once a model has been loaded, the server 1 starts a data broadcast to all connected clients 2. The geometric model itself resides only in the modeling kernel of the server 1, and only a graphical representation of the model, together with essential structural information, is sent over the network 6.

The image is conveyed to the clients by use of the streaming process. The clients can access the 3D model party-by-part as it is sent over the network. In addition to the basic information such as the assembly and parts structure, the initial load process disseminates the internal system identification of all model entities including faces, edges and vertices. These references enable the client to identify components of these 3D models when sending requests to the sever during the design process.

Once the initial load phase is complete, each client is equipped with all data needed to render the model rapidly, locally and independently of other clients and of the server. The data received from the server is accumulated in the scene graph structure in the client. Operations such as dynamic panning, zooming and rotation are available for independent local viewing.

It is clearly important, in collaborative design, that all clients are able to see the same parts of the model from the same perspective and to identify and dynamically refer to model elements. In the preferred embodiment, each client receives the same information about the 3D model residing in the sever. Views can be shared among two or more participants. Since all clients have the rendering information in their local scene graphs, there is no need to send bitmaps or pixels. Instead, synchronization is accomplished by exchanging a small amount of data describing the viewing parameters. These include the position of the virtual camera, the viewing direction and the zoom factor. Dynamic pointing tools can then be used in the shared views. Even the low bandwidth achievable using a 28.8 k modem dial-up connection is sufficient for synchronization of views and pointers in near-real-time.

Clients can select entities of the model in the local displays 5. As the clients receive structural information relating to assemblies, parts, faces, edges, etc., there is an association between graphical and model elements in addition to the graphical representation of the model. The ability to identify model elements and to have a live connection between client and server enables clients to address model-based enquiries to the server. They can inspect the properties of parts or faces and can ask the server for precise measurements, with model accuracy. The results are immediately routed back to the client for display. As far as the user is concerned, the whole operation is completely transparent, and appears to be happening locally.

For modifying the model, in the preferred system, commands are triggered by the clients, but executed on the geometric model in the server 1. It is an essential factor in the response time of the system that the changes are made to the master model which resides on the server, rather than to the local models which only represent a reduced data depiction.

Figure 3:
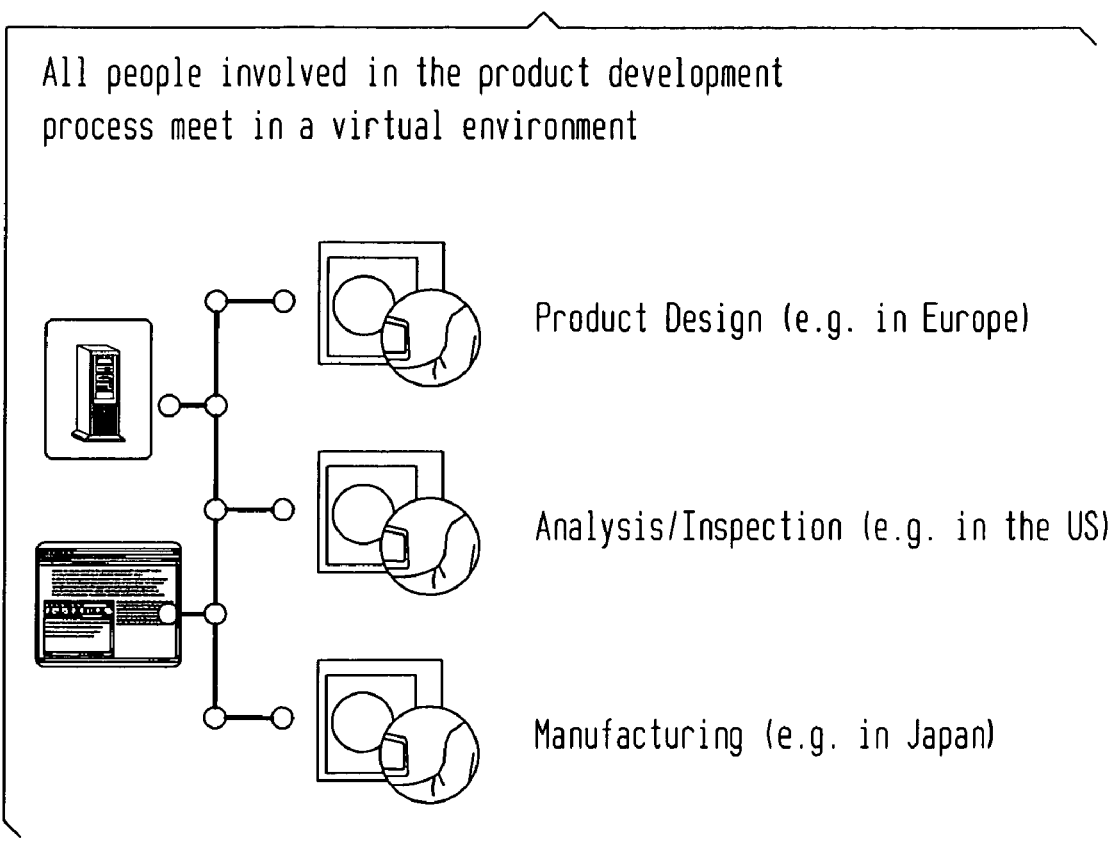
FIG. 3 shows a stage in the collaborative design session where various modifications are made to the design simultaneously.

Any change made to the model residing in the server needs to be conveyed to all connected clients. It is essential in a collaboration session that everybody involved is looking at and working with the most up-to-date version of the design. FIG. 3 shows examples of design changes made during the session.

In the preferred system, the modeling kernel of the sever is capable of identifying changes individually. Thus, the clients can incrementally update the model representation in their scene graphs and further, any model update only requires the transfer of any information which is actually changed. This clearly reduces the size of data transferred and the transmission time, and makes it possible work in real time.

An important feature of the present invention is the use of notes and references to capture the results of the collaboration session. These results can be geometric, such as actual changes made to the model, or non-geometric such as discussion, decisions, reasons for making changes, items or ideas to investigate further.

Information attached to the model can be in the form of text notes and/or URL links identifying other web sites/resources. These notes can be captured and reviewed collectively and then stored with the model and/or published as a collaboration report 7.

The present invention automatically and chronologically logs every single change made during a collaborative session to the CAD model and an abstract description of the history of the design is directly saved with the associated object, independent of the CAD model used.

At the end of a session, the object design history, i.e. the changes which have taken place, reasons for the changes, etc. are directly exported, together with the object data, and the model and its associated report or log 7 is saved, as previously discussed.

Thus, the system during the collaboration session automatically generates collaboration logs 7 as shown in FIG. 4. These contain such information as the name of the person making the changes, the date and time of the change, a status indicating if all members of the session agreed on the change, the location of the person making the change, a description of the method used to perform the change, a complete description of all parameters to be applied to the method used to perform the design change, a text description of the design intent or reason for the change and/or a URL to refer to associated web pages. Of course different combinations of these and other details may be logged, according to the requirements of the users.

The information to be contained in the log is automatically collected during the design session, as and when the design changes are made. A collaboration log is created containing all of this information and can be visually displayed on the screen of all clients attending the session. Anybody can view this information at any time.

The logs can later be used to enable designers to review the changes made during the session and the reasons for these changes. The designer can, for example, produce a table of all the changes that were made in the collaborative environment. The format of the log is completely independent of the CAD system used. Since the modifications are made to the server-based original model, the changes carried out and logged during the sessions are also available off-line or independently of the clients, e.g., as an HTML report.

Since the logs are created automatically, no additional effort is required to collect this information during the collaborative session.

The present invention, therefore, provides an improvement on existing CAD systems in that all changes made to the CAD model during a design session are automatically and chronologically logged and attached to the object model as an abstract description of the history of the object design, independent of the CAD program used to produce the model. This is particularly advantageous with decentralized CAD system in which several designers, manufacturers, etc. are working together, simultaneously, on the same design, but from different locations. At the end of a design session, the design history is directly exported, together with the data defining the designed object, into the destination system.

The abstract description of the design process is in a form independent of the system used.

It will be appreciated that, although specific embodiments of the invention have been described herein for purposed of illustration, various modifications may be made without departing from the spirit and scope of the invention. Accordingly the scope of protection is limited only b the following claims and their equivalents.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A collaboration server accessible from disparate locations, the collaboration server comprising:
   a memory for storing a master model designed in a collaborative session;
   a kernel operable to provide access to data required by multiple independent users, the data stored in a system independent of the collaboration server and related to a design of the master model in the collaborative session, the design of the master model carried out in the collaborative session in a manner that allows two or more of the users to simultaneously collaborate on the design of the master model;

an input function for receiving commands to modify the data from the multiple independent users, the commands executed by the collaboration server to modify the master model, a change to the master model being conveyed from the collaboration server to the multiple independent users;

a logging function operable to log the change to the master model in a log as a result of the commands from the multiple independent users;

a report function accessible by the multiple independent users, the report function generating a report comprising the change to the master model during the collaborative session; and a network device for transmitting the information related to the change to the master model to the multiple independent users.

2. The collaboration server of claim 1 wherein the system independent of the collaboration server is a computer aided design system.

3. The collaboration server of claim 2 wherein the data comprises computer aided design elements defining an object under design.

4. The collaboration server of claim 1 wherein the logging function includes logging information related to the change to the master model.

5. The collaboration server of claim 4 wherein the information related to the change includes an identity of the user making the change and a time of the change.

6. The collaboration server of claim 1 wherein the report function generates a hypertext markup language document accessible by the multiple independent users.

7. The collaboration server of claim 1 wherein the log is maintained chronologically.

8. The collaboration server of claim 1 wherein each change to the master model is maintained in a respective record.

9. The collaboration server of claim 8 further comprising a collaboration log comprising the respective records.

10. The collaboration server of claim 1 wherein the collaboration server, the independent system and the multiple independent users are connected via a network.

11. A computer-implemented method for collaborating between multiple independent users at disparate locations, the method comprising:

providing access using a collaboration server to data required by the multiple independent users, the data being stored in a system independent of the collaboration server and related to a master model designed in a collaborative session, the design of the master model carried out in the collaborative session in a manner that allows two or more of the users to simultaneously collaborate on the design of the master model;

receiving commands to modify the master model from the multiple independent users, the commands executed by the collaboration server to modify the master model, a change to the master model being conveyed from the collaboration server to the multiple independent users;

logging the change to the master model in a log as a result of the commands from the multiple independent users; and creating a report accessible by the multiple independent users, the report comprising the change to the master model made during the collaborative session.

12. The method of claim 11 wherein the system independent of the collaboration server is a computer aided design system.

13. The method of claim 12 wherein the data comprises computer aided design elements defining an object under design.

14. The method of claim 11 further comprising logging information related to the change to the master model.

15. The method of claim 14 wherein the information related to the change includes an identity of the user making the change and a time of the change.

16. The method of claim 11 wherein creating a report comprises generating a hypertext markup language document accessible by the multiple independent users.

17. The method of claim 11 wherein the log is maintained chronologically.

18. The method of claim 11 further comprising creating a respective record reflecting each change to the master model.

19. The method of claim 18 further comprising creating a collaboration log comprising the respective records.

20. The method of claim 11 wherein the collaboration server, the independent system and the multiple independent users are connected via a network.

* * * * *

UNITED STATES PATENT AND TRADEMARK OFFICE
CERTIFICATE OF CORRECTION

PATENT NO. : 8,214,423 B2
APPLICATION NO. : 11/446033
DATED : July 3, 2012
INVENTOR(S) : Stefan Freitag It is certified that error appears in the above-identified patent and that said Letters Patent is hereby corrected as shown below:

On the title page, please change the Assignee from "Hewlett-Packard Company; Parametic Technology Corporation" to --Parametric Technology Corporation--.

Signed and Sealed this
Twenty-first Day of May, 2013

Teresa Stanek Rea
*Acting Director of the United States Patent and Trademark Office*